Feb. 28, 1967  C. R. FERRIN  3,306,111

CHROMATOGRAPH SAMPLE SYSTEM

Filed Dec. 7, 1964  2 Sheets-Sheet 1

INVENTOR.
CHARLES R. FERRIN
BY
ATTORNEY 3,306,111
CHROMATOGRAPH SAMPLE SYSTEM
Charles R. Ferrin, Tulsa Okla., assignor, by mesne assignments, to Combustion Engineering, Inc., a corporation of Delaware
Filed Dec. 7, 1964, Ser. No. 416,230
7 Claims. (Cl. 73—422)

The present invention relates to placing a sample for a chromatograph in a stream of carrier gas. More particularly, the invention relates to utilizing differential pressures to move a sample with sharply defined boundaries into the middle of a stream of carrier gas so the sample will be separated by the chromatograph column.

One of the difficult problems in the art of chromatography is moving a sample into the column so its components will be sharply separated by the column. If the sample is not sharply defined as it moves into the column, the components will overlap as they emerge. This undesirable result is called "tailing" in the art of chromatography. Many arrangements have been developed to solve the problem of "tailing," however, none have been as successful as the arrangement in which the present invention is embodied.

A principal object of the present invention is to insert a sample with sharply defined boundaries into a stream of carrier gas with a minimum of friction between the sample and the walls through which the carrier gas flows to the column.

Another object is to move a sample with sharply defined boundries into a stream of carrier gas with a pressure greater than that of the carrier gas.

The present invention contemplates providing a valve passage in which a sample for chromatographic analysis is isolated. The valve passage is then connected to the column entrance and a gas having a pressure higher than the carrier gas is applied to force a predetermined portion of the sample from the passage and into the carrier gas.

The invention also contemplates directing the sample portion along the axis of the stream of carrier gas, as quickly as the differential in pressures will permit.

Figure 1:
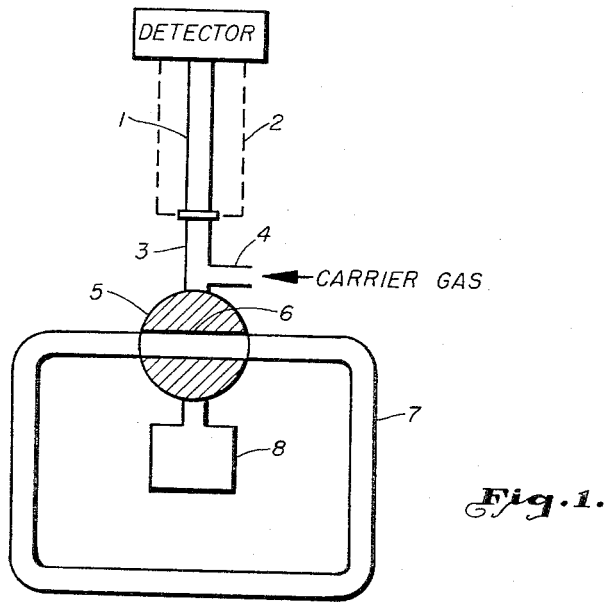
Figure 2:
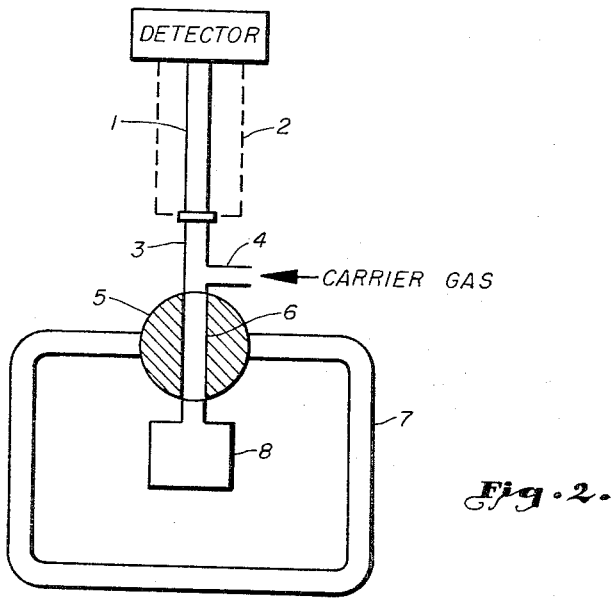
Figure 3:
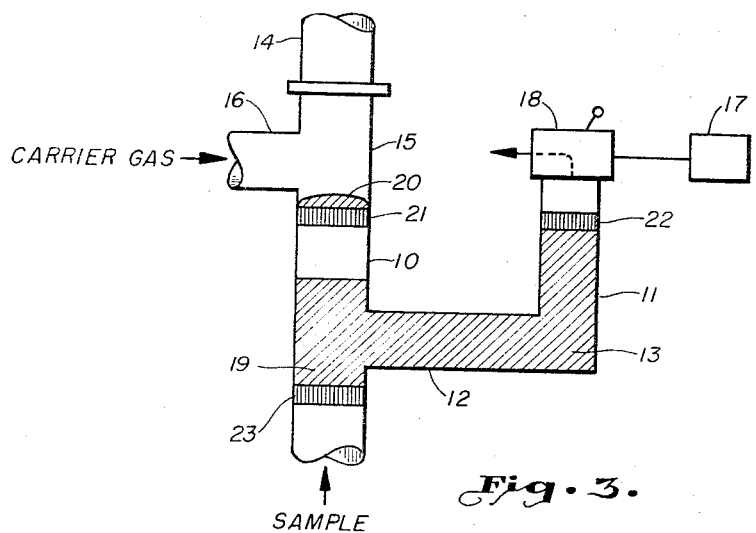
Figure 4:
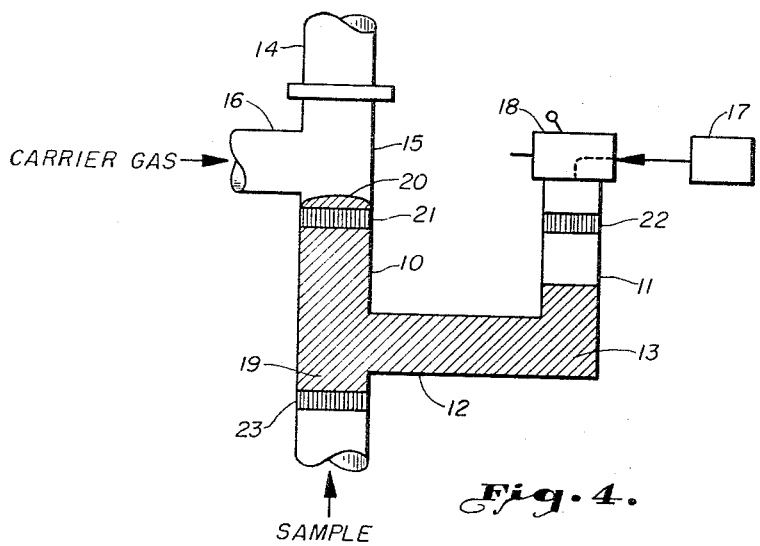

Other objects, advantages and features of the present invention will become apparent to one skilled in the art upon consideration of the written specification, appended claims, and attached drawings, wherein;

FIGS. 1 and 2 are diagrammatic illustrations of an entrance system for a chromatographic column embodying the present invention; and FIGS. 3 and 4 are diagrammatic illustrations of another form of valving for an entrance system which also embodies the present invention.

FIGS. 1 and 2 illustrate, diagrammatically, structure with which a basic concept of the invention is actually reduced to practice. A chromatographic column 1 is indicated, with a detector at its exit responsive to components discharged from the column. The column may be heated by various arrangements. A heated enclosure for the column is indicated at 2.

A passage 3 is coupled to the column entrance and provides a means whereby a stream of carrier gas moves a sample into column 1 for chromatographic separation. With the present invention, the sample is placed in this stream of carrier gas in such a way as to obtain sharp separation of the components of the gas by the column without tailing.

It does not appear necessary to show details of a source for carrier gas. Whatever the specific arrangement at such source, the carrier gas is conducted to passage 3 through connecting conduit 4. For present purposes, this carrier gas is assumed to move continuously through conduit 4, into passage 3 and then into column 1. It is structure formed to embody the concepts of the present invention which moves a sample into this stream of carrier gas as a body with sharply defined boundaries.

A valve 5 is diagrammatically illustrated in only its movable passage 6. The only difference between FIG. 1 and FIG. 2 is the position of valve passage 6. For present purposes, valve 5 is a two-position valve with passage 6 first filled with the sample and then connected to passage 3 for insertion of the sample into the stream of carrier gas in passage 3.

The use of a valve passage to dimensionally define a sample for a chromatographic column is old. Further, it is now well known that such valve passage may be connected as a portion of a sample loop and the valve passage then repositioned for connection to a chromatographic column. Finally, it is well-known to push the sample from the valve passage by carrier gas, the sample then moving into the column for analysis. However, it has not been recognized that the friction between the gas sample and the valve passage walls induces tailing of the analysis. It has been erroneously assumed in the past that the slug of sample in the small valve passage is forced from the passage by carrier gas with sharply defined boundaries. Such is not the case. The gas sample moved from a valve passage will cling to the sides of the valve passage and, for chromatographic purposes, undesirably tail as the carrier gas moves the sample into, and through, the column. The present invention utilizes two general arrangements to maintain the sample with sharply defined boundaries as it is moved into the carrier gas and subsequently into the column.

First, passage 6 is connected into sample loop 7. The sample is prepared in the usual way within loop 7 and the passage of valve 5 slices a dimensionally exact slug from the loop for analysis in column 1. Now passage 6 is rotated into connection with passage 3. At the same time, a source 8 of gas is provided for simultaneous connection with the opposite end of valve passage 6. This arrangement of valve passage 6 between passage 3 and source 8 is illustrated in FIG. 2.

The gas of source 8 is carried at a pressure above the pressure of the carrier gas moving into passage 3 from conduit 4. With this pressure differential between these two gases, at least a portion of the sample in valve passage 6 is moved into passage 3. Incidentally, the gas of source 8 may have various compositions although it is usual to use carrier gas for this purpose.

Although the gas of source 8 is at a higher pressure than the carrier gas of conduit 4, there remains the friction between the walls of the valve passage 6 and the gas sample. Simply displacing the gas sample from valve passage 6 with a gas at a pressure higher than the carrier gas does not completely solve the problem.

It is desired that the chromatographic analysis be quantitatively reliable. In other words, the same quantity of sample should be introduced into column 1 each analysis. Therefore, two things are desired; tailing could be eliminated and a fixed amount of sample should be introduced into the column 1. Both of these conditions are met by the present invention.

Rather than attempt to empty the entire sample volume from valve passage 6, only a finite portion is injected therefrom by rotating valve 5 at a fixed speed past its connection to passage 3. The connection between source 8 and passage 3 is made through valve passage 6 for a fixed period of time, dependent upon the speed of rotation of valve 6. Therefore, a portion of the sample within valve passage 6 is ejected therefrom by the force of the gas of source 8 as passage 6 is rotated from the position illustrated in FIG. 1, to the position illustrated in FIG. 2 and back to the position illustrated in FIG. 1.

Additionally, the sample portion ejected from valve passage 6 is directed down the axis of passage 3. The result of thus directing the ejected sample portion is that the slug of sample portion is actually encased in the surrounding carrier gas from passage 3. Without the retarding friction with the walls of passage 3, the sample retains its sharply defined boundaries as it moves down the axis of passage 3 and enters column 1. A primary objective of the present invention is therefore carried out with the structure illustrated in FIGS. 1 and 2.

FIGS. 1 and 2 illustrate some basic aspects of the concept of pressure differential sample injection into a stream of carrier gas. FIGS. 3 and 4 utilize this principle in connection with a unique valve arrangement.

In FIGS. 3 and 4, a U-tube structure is indicated. The legs of this U-tube are legs 10 and 11, connected at their bottoms with leg 12. A body 13 of liquid metal is placed within this U-tube structure.

Leg 10 is connected to a chromatograph column 14 with a passageway 15 through which a stream of carrier gas moves from a conduit 16. As in FIGS. 1 and 2, it is an object of the structure disclosed in FIGS. 3 and 4 to discharge a sample of gas to be analyzed along the axis of the carrier gas stream flowing in passageway 15 and passing from passageway 15 into column 14.

The sample to be analyzed is injected axially into passageway 15 from U-tube leg 10. A gas sample to be analyzed is placed in leg 10 and the surface of the liquid metal within leg 10 is moved up and down as required to push sample into passageway 15 directly above leg 10.

To reciprocate the liquid metal in leg 10, a gas pressure higher than the pressure of the sample to be analyzed is applied to the surface of the liquid metal in leg 11. As this pressure is periodically applied to, and removed from, the surface of the liquid metal in leg 11, a portion of the body 13 of liquid metal exchanges between legs 10 and 11, pushing the gas sample into leg 10 into conduit 15 for travel into chromatograph column 14.

A source of high pressure gas is provided at 17 and is controlled by a valve 18. FIG. 3 illustrates the position of valve 18 which will connect the gas space in leg 11 to atmosphere or some pressure less than that of source 17. FIG. 4 indicates that valve 18 has connected the high pressure gas of source 17 to the top of leg 11 so the liquid metal in leg 11 will have its surface depressed with corresponding elevation of the surface of liquid metal of leg 10. Thus, the use of the difference between the pressure of source 17 and the pressure of the gas sample placed in leg 10, as well as the pressure of the carrier gas, is utilized to inject the gas sample into the carrier gas within conduit 15.

In order to place a sample of gas within leg 10 for injection into the carrier gas, a valve system is supplied which will limit the upward passage of the liquid metal in the U-tube structure while remaining pervious to gas. This valve system utilizes a material with very small holes, in the order of 1-5 microns. Additionally, the material is not wettable by the liquid metal selected for body 13. Material of this nature, whether formed of glass or a metallic substance, is commonly designated as "frit." Bodies of this frit are placed within legs 10 and 11 and across entrance 19 below leg 10. Additionally, a small body of liquid metal is placed above the frit structure in leg 10. This liquid metal body 20 is supported by frit body 21, preventing the passage of carrier gas down into leg 10 but allowing a gas sample in leg 10 to be pushed up through frit body 21 and liquid metal body 20 for the required injection of the sample into the column 14.

Frit body 22 is placed laterally opposite body 21, in leg 11. Finally, frit body 23 is placed across opening 19. Therefore, the liquid metal body 13 is prevented from passing up through body 22 or falling down through body 23.

The operation of this arrangement should now be evident. As the pressure from source 17 is alternately applied through body 22 to the surface of liquid metal 13, the liquid metal is pushed, as a piston, up leg 10 to body 21. Valve 18 is then placed in its opposite position to vent the high pressure gas from leg 11. The gaseous sample is then passed up through body 23 in opening 19 to bubble up through the liquid body 13 and form a dimensionally fixed body of sample as indicated in FIG. 3. Valve 18 is then operated and the high pressure gas of source 17 is applied to move the surface of the liquid metal in leg 10 to the position shown in FIG. 4, discharging the gas sample into the carrier gas of conduit 15. The gas sample is injected in axial direction along conduit 15 and is thereby isolated from frictional contact with the walls of conduit 15. With the differential pressure of injection maintained sufficiently high, the sample of gas is injected into carrier gas quickly enough to retain its dimensions sharp. The result is a chromatographic analysis of the gas sample without tailing.

The generalized reference to the material from which the frit bodies may be made has been deliberate. Also, the reference to the body 13 as being liquid metal has been made general enough to indicate a number of liquid metals could be used. Mercury is the more common liquid metal which can be used. The basic requirement is that the frit material, which may be glass, or metal, etc. should not be wettable by the liquid metal. The combination of the non-wettability of the frit material, together with its very small holes size, will provide the desired valve function which will enable the embodiments of FIGS. 3 and 4 to function.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The present invention having been described, what is claimed is:

1. A method of injecting a sample to be analyzed into a chromatographic column including,
    passing the prepared sample into a valve passage,
    isolating the sample in the valve passage,
    connecting one end of the valve passage to a source of gas having a pressure higher than the pressure of carrier gas connected to the column,
    and connecting the discharge end of the valve passage to the column supplied the carrier gas having a pressure lower than the source of gas connected to the one end of the valve passage,
    whereby the sample isolated by the valve passage is forced into the carrier gas connected to the column and enters the column as a body with sharply defined boundaries.

2. An entrance system for a chromatograph, including,
    a source of carrier gas at a first pressure,
    a passage connecting the source to a chromatograph column,
    a valve element having a movable passage,
    a source of gas at a second pressure higher than the first pressure, a passage in which a prepared sample to be analyzed by a column is placed, and means for moving the movable valve passage into communication with the passage containing the prepared sample and then moving the passage into communication with the source of gas at the second pressure and the passage connecting the source of carrier gas at the first pressure so the second pressure will force the sample from the valve passage into the passage between the first source and the column with sharply defined boundaries.

3. A method of injecting a sample to be analyzed into a chromatographic column including, placing the prepared sample into a valve passage, and rotating the valve passage into simultaneous communication with a gas source having a pressure higher than the pressure of carrier gas connected to the column and communication with the entrance to a chromatographic column for a predetermined period of time, whereby the sample isolated by the valve passage is forced into the carrier gas connected to the column and enters the column as a body with sharply defined boundaries.

4. An entrance system for a chromatograph, including,
a chromatographic column,
a source of carrier gas connected to the entrance of the column,
a passage below the column entrance and connected to the column entrance,
a check valve at the connection between the column entrance and passage which allows flow only from the passage toward the column,
means for placing a sample to be analyzed in the passage,
and a liquid piston arranged to reciprocate in the passage and force the gas sample into the column.

5. The system of claim 4 in which,
the check valve is formed as a partition of frit which is non-wettable by a liquid body supported on the frit so as to cover the holes in the frit and prevent the flow of gas downward from the column entrance and into the passage.

6. An entrance system for a chromatograph, including,
a chromatographic column,
a source of carrier gas connected to the entrance of the column,
a passage below the column entrance and connected to the column entrance,
a U-tube connected to the lower end of the passage by one leg,
a liquid metal in the U-tube,
a source of fluid arranged for connection to the other leg of the U-tube, the source of fluid having a pressure higher than the pressure of the carrier gas,
a valve for connecting the other leg of the U-tube alternately to atmosphere and the source of fluid,
a check valve in each leg of the U-tube to permit only gaseous flow from the one leg into the passage above and gaseous flow into and out of the other leg,
and means for placing a gas sample to be analyzed by the column above the surface of the liquid metal in the one leg of the U-tube from which reciprocation of the metal in the leg will force the sample into the passage, the reciprocation being brought about by actuation of the valve connecting the other leg of the U-tube.

7. An entrance system for a chromatograph, including,
a chromatographic column,
a valve element arranged to connect a passage in the element with the column,
means for placing a sample to be analyzed by the column within the valve element passage,
a source of carrier gas connected between the valve element passage and the column with an arrangement which causes the sample within the passage to be ejected along the axis of the stream of carrier gas flowing into the column,
a source of fluid pressure higher than the pressure of the source of carrier gas,
and means for placing the valve passage into simultaneous communication between the source of high pressure and the column,
whereby the sample is injected into the carrier gas and enters the column as a body with sharply defined boundaries.

References Cited by the Examiner
UNITED STATES PATENTS

| | | |
|---|---|---|
| 2,839,152 | 6/1958 | Tracht. |
| 3,103,807 | 9/1963 | Broerman _____ 73—23.1 |
| 3,186,234 | 6/1965 | Solnick et al. _____ 73—422 |

LOUIS R. PRINCE, *Primary Examiner.*

S. C. SWISHER, *Assistant Examiner.*